US009949568B2

United States Patent
Zouzal et al.

(10) Patent No.: US 9,949,568 B2
(45) Date of Patent: *Apr. 24, 2018

(54) PELVIC AND SACRAL BLADDER ASSEMBLY

(71) Applicants: Lear Corporation, Southfield, MI (US); Winsen C. Zouzal, Detroit, MI (US)

(72) Inventors: Winsen C. Zouzal, Detroit, MI (US); Gerald Patrick, Shelby Township, MI (US); Walter T. Cichocki, Brighton Township, MI (US); Ted Smith, Waterford, MI (US); Michelle A. Pereny, Farmington Hills, MI (US)

(73) Assignee: Lear Corporation, Southfield, MI (US)

( * ) Notice: Subject to any disclaimer, the term of this patent is extended or adjusted under 35 U.S.C. 154(b) by 47 days.

This patent is subject to a terminal disclaimer.

(21) Appl. No.: 14/964,035

(22) Filed: Dec. 9, 2015

(65) Prior Publication Data

US 2017/0164747 A1   Jun. 15, 2017

(51) Int. Cl.
*B60N 2/44* (2006.01)
*A47C 7/46* (2006.01)
*A47C 7/14* (2006.01)

(52) U.S. Cl.
CPC .......... *A47C 7/467* (2013.01); *A47C 7/14* (2013.01); *B60N 2/4415* (2013.01)

(58) Field of Classification Search
CPC ........ B60N 2/665; B60N 2/4415; B60N 2/66; B60R 21/207; A47C 7/46
USPC ................................ 297/284.3, 284.4, 284.1
See application file for complete search history.

(56) References Cited

U.S. PATENT DOCUMENTS

| 3,652,126 A | 3/1972 | Folling |
| 4,114,214 A * | 9/1978 | VonHeck ............... A47C 7/022 297/284.1 |
| 4,516,568 A | 5/1985 | Baxter et al. |
| 4,592,588 A | 6/1986 | Isono et al. |
| 4,615,563 A | 10/1986 | Kobayashi |
| 4,840,425 A * | 6/1989 | Noble ..................... A47C 7/467 297/284.1 |
| 4,920,591 A | 5/1990 | Sekido et al. |

(Continued)

FOREIGN PATENT DOCUMENTS

| DE | 3690372 T1 | 7/1987 |
| DE | 4022423 A1 | 1/1991 |
| WO | 9611614 A1 | 4/1996 |

OTHER PUBLICATIONS

U.S. Appl. No. 14/575,474 Adjustable Seat Assembly, filed Dec. 18, 2014; Inventor: Winsen C. Zouzal.

(Continued)

*Primary Examiner* — Jose V Chen
(74) *Attorney, Agent, or Firm* — Brooks Kushman P.C.

(57) ABSTRACT

An air bladder assembly for a seat comprising is provided. A central sacral bladder has a support surface defined by an enlarged width portion connected to an elongated tapered portion, wherein the tapered portion is defined by elongated lateral sides. A pair of side iliac bladders is provided so that one of the side bladders is positioned adjacent each of the elongated sides of the central bladder. A support surface of the central air bladder is not parallel to a support surface of the side air bladders when the air bladder assembly is inflated.

17 Claims, 4 Drawing Sheets

(56) References Cited

U.S. PATENT DOCUMENTS

| | | | |
|---|---|---|---|
| 4,965,899 A | 10/1990 | Sekido et al. | |
| 4,981,131 A * | 1/1991 | Hazard | A47C 4/54 |
| | | | 128/118.1 |
| 4,981,325 A | 1/1991 | Lacharkow | |
| 5,127,708 A | 7/1992 | Kishi et al. | |
| 5,129,704 A * | 7/1992 | Kishi | B60N 2/0224 |
| | | | 297/284.1 |
| 5,155,685 A | 10/1992 | Kishi et al. | |
| 5,277,474 A * | 1/1994 | Hannagan | A47C 4/54 |
| | | | 297/284.1 |
| 5,283,735 A * | 2/1994 | Gross | A47C 4/54 |
| | | | 297/284.1 |
| 5,320,409 A | 6/1994 | Katoh et al. | |
| 5,812,399 A * | 9/1998 | Judic | B60N 2/0224 |
| | | | 296/65.01 |
| 5,860,699 A | 1/1999 | Weeks | |
| 6,037,731 A * | 3/2000 | Fruehauf | B60N 2/0244 |
| | | | 297/284.1 |
| 6,055,473 A | 4/2000 | Zwolinksi et al. | |
| 6,074,006 A | 6/2000 | Milosic et al. | |
| 6,088,642 A * | 7/2000 | Finkelstein | B60N 2/002 |
| | | | 297/284.1 |
| 6,125,851 A | 10/2000 | Walker et al. | |
| 6,203,105 B1 | 3/2001 | Rhodes, Jr. | |
| 6,273,810 B1 | 8/2001 | Rhodes, Jr. et al. | |
| 6,384,715 B1 | 5/2002 | Potter | |
| 6,677,720 B2 * | 1/2004 | Fraser | B60N 2/0244 |
| | | | 297/284.1 |
| 6,682,059 B1 | 1/2004 | Daniels et al. | |
| 6,901,617 B2 | 6/2005 | Sprouse, II et al. | |
| 7,059,678 B1 | 6/2006 | Taylor | |
| 7,113,100 B2 * | 9/2006 | Yoshinori | B60H 1/00 |
| | | | 297/284.1 |
| 7,152,920 B2 | 12/2006 | Sugiyama et al. | |
| 7,537,286 B2 | 5/2009 | Walker et al. | |
| 7,878,590 B1 | 2/2011 | Bilak et al. | |
| 7,931,334 B1 * | 4/2011 | Caruso | A47C 7/022 |
| | | | 297/217.3 |
| 8,157,321 B2 | 4/2012 | McMillen et al. | |
| 8,603,001 B2 * | 12/2013 | Fujita | A61B 5/024 |
| | | | 297/284.1 |
| 8,671,482 B2 | 3/2014 | Willingham | |
| 8,814,269 B2 * | 8/2014 | Suzuki | B60N 2/4228 |
| | | | 297/216.13 |
| 2002/0047297 A1 * | 4/2002 | Longhi | B60N 2/0224 |
| | | | 297/284.1 |
| 2002/0056709 A1 | 5/2002 | Burt | |
| 2002/0180249 A1 | 12/2002 | Felton et al. | |
| 2003/0230917 A1 * | 12/2003 | Dorfler | B60N 2/4415 |
| | | | 297/284.1 |
| 2005/0264069 A1 * | 12/2005 | Makhsous | A47C 17/163 |
| | | | 297/284.1 |
| 2006/0103204 A1 | 5/2006 | Walker et al. | |
| 2009/0091168 A1 * | 4/2009 | Kretschmer | A47C 7/42 |
| | | | 297/284.1 |
| 2009/0152916 A1 | 6/2009 | Lin et al. | |
| 2010/0139003 A1 | 6/2010 | Moutafis | |
| 2010/0207431 A1 | 8/2010 | Petzel et al. | |
| 2010/0276973 A1 * | 11/2010 | Zenk | B60N 2/4415 |
| | | | 297/284.3 |
| 2010/0289302 A1 * | 11/2010 | Cheng | B60N 2/002 |
| | | | 297/180.12 |
| 2012/0143108 A1 | 6/2012 | Bocsanyi et al. | |
| 2013/0285426 A1 | 10/2013 | Arant et al. | |
| 2014/0265491 A1 | 9/2014 | Galbreath et al. | |
| 2014/0265492 A1 * | 9/2014 | Larsen | F16K 99/0028 |
| | | | 297/284.1 |
| 2015/0035323 A1 | 2/2015 | Diop et al. | |
| 2015/0126916 A1 | 5/2015 | Hall et al. | |
| 2015/0145296 A1 * | 5/2015 | Hotary | B60N 2/0228 |
| | | | 297/217.1 |
| 2015/0183353 A1 | 7/2015 | Chen | |
| 2016/0046216 A1 * | 2/2016 | Byun | B60N 2/4415 |
| | | | 297/284.1 |
| 2016/0129920 A1 | 5/2016 | Hall et al. | |
| 2016/0185263 A1 | 6/2016 | Uno et al. | |
| 2016/0288681 A1 | 10/2016 | Ferretti et al. | |
| 2016/0325641 A1 | 11/2016 | Ohno et al. | |

OTHER PUBLICATIONS

U.S. Appl. No. 14/869,093 Air Bladder Assembly for Seat Bottoms of Seat Assemblies, filed Sep. 29, 2015; Inventor: Gerald Patrick.
Office Action of U.S. Appl. No. 14/964,095 dated May 8, 2017; 18 pages.
Office Action of German application No. 102016222465.4; dated Oct. 11, 2017; 8 pages.

* cited by examiner

PELVIC AND SACRAL BLADDER ASSEMBLY

TECHNICAL FIELD

Various embodiments are directed to an air bladder assembly for a pelvic region of a seat.

BACKGROUND

U.S. Patent Publication No. US 2014/0265491 by Lear Corporation, published on Sep. 18, 2014, illustrates and describes an air bladder assembly for a seat.

SUMMARY

According to one embodiment, a seat assembly is provided with a seat bottom and a seat back mounted adjacent the seat bottom and extending generally in an upright direction. An air bladder assembly for a seat is provided. A central sacral bladder has a support surface defined by an enlarged width portion connected to an elongated tapered portion, wherein the tapered portion is defined by elongated lateral sides. A pair of side iliac bladders is provided so that one of the side bladders is positioned adjacent each of the elongated sides of the central bladder. A support surface of the central air bladder is not parallel to a support surface of the side air bladders when the air bladder assembly is inflated.

According to another embodiment, the seating surface of the seat back and the seat bottom are joined at a bite line. The three bladders are positioned adjacent the bite line.

According to another embodiment, the central bladder is oriented with the elongated tapered portion positioned closer to the bite line. The side bladders are oriented with the enlarged width portion closer to the bite line.

According to another embodiment, inflation of the central air bladder inclines the central support surface from the taper portion to the enlarged width portion relative to a seating surface of the seat back.

According to another embodiment, the side air bladders inflate so that a side support surface is generally parallel to the seating surface of the seat back.

According to another embodiment, when the three air bladders are inflated, a support surface of the central air bladder is not parallel to a support surface of the side air bladders.

According to another embodiment, the support surface of each of the three air bladders is a generally hexagonal shape.

According to another embodiment, the lateral array of air bladders is symmetric about an upright axis of the seat back.

According to another embodiment, the seat back includes a frame and a distal end of each of the three air bladders is aligned with a lower edge of a seat back frame.

According to one other embodiment, an air bladder assembly for a seat is provided. The assembly includes a central sacral bladder having a support surface defined by an enlarged width portion connected to an elongated tapered portion, wherein the tapered portion is defined by elongated lateral sides. A pair of side iliac bladders are positioned adjacent each of the elongated sides of the central bladder. A support surface of the central air bladder is not parallel to a support surface of the side air bladders when the air bladder assembly is inflated.

According to one other embodiment, inflation of the central air bladder inclines the central support surface from the tapered portion to the enlarged width portion relative to a seating surface of a seat back. The side air bladders inflate so that the side support surface is generally parallel to the seating surface of the seat back.

According to a further embodiment, the central support surface is a generally hexagonal shape.

According to another embodiment, the side bladders are positioned on opposite lateral sides of the central air bladder. The central air bladder and side air bladders have a length in an upright direction being generally equal whereby distal ends of the central air bladder and side bladders are aligned.

According to another embodiment, a lower distal end of the side air bladders and the central air bladder are aligned.

According to one other embodiment, a method for adjusting a seat assembly is provided. At least one of a pair of iliac air bladders oriented in a pelvic region of a seat back is inflated. After initiating at least one iliac air bladder, a central sacral air bladder oriented between the pair of iliac bladders is inflated.

According to another embodiment, the method includes receiving data from a plurality of sensors operably connected to the seat back to detect a seating position of an occupant. The data is compared to determine if the occupant is seated evenly. The pair of iliac bladders is adjusted to balance an occupant posture seating position in a lateral direction. The pair iliac air bladders are inflated incrementally until a pressure in each of the iliac air bladders is generally equal.

BRIEF DESCRIPTION OF THE DRAWINGS

Certain embodiments of the present disclosure are pointed out herein. However, other features of the various embodiments will become more apparent and will be further understood by referring to the following detailed description in conjunction with the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Moreover, except for otherwise expressly indicated, all numerical quantities in this description indicating amounts are to be understood as modified by the word "about" in describing the broader scope of the disclosure. Also, unless expressly stated to the contrary, the description of a group or class of materials as suitable or preferred for a given purpose in connection with the disclosure implies that any two or more members of the group or class may be equally suitable and preferred.

Figure 1:
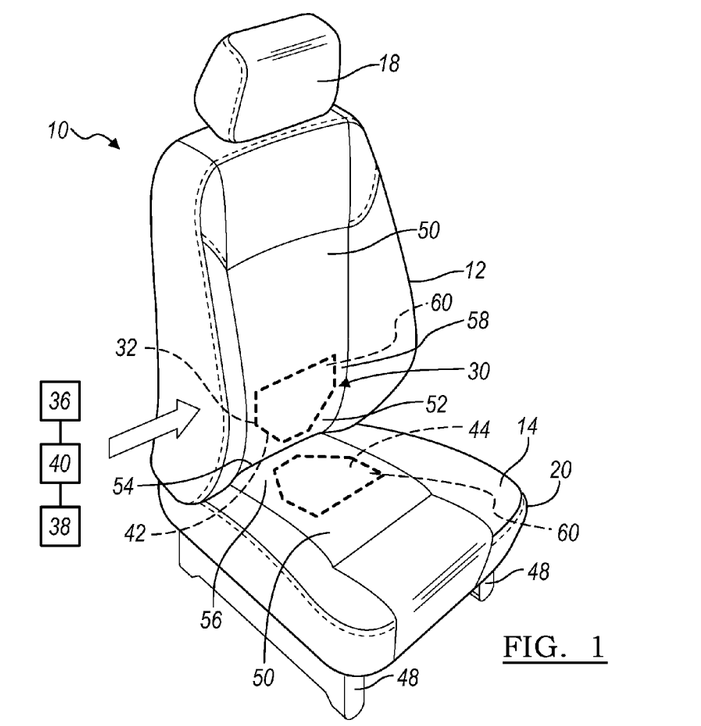
FIG. 1 is a perspective view of an exemplary seat assembly incorporating a sacral support system.

Referring now to the Figures, where like numerals are used to designate like structures throughout the drawings, a seat assembly 10 in accordance with at least one embodiment of the present invention is generally shown in FIG. 1. The seat assembly 10 includes a seat back 12 and a seat bottom 14. As shown, the seat back 12 extends generally in the upright direction and is pivotally attached to the seat bottom 14. Each of the seat back 12 and the seat bottom 14 typically include a cushion or padding (not shown) and a trim cover 20 for decoratively covering and protecting the cushion. Typically, the cushion is made of an expandable foam material and is molded to a desired shape. The seat assembly 10 may also include a head restraint 18 that is adjustable in relation to the seat back 12.

While the seat assembly 10 in FIG. 1 is illustrated as a vehicle seat assembly, it should be understood that the principles of the present application are applicable to other types of seat assemblies, such as for an aircraft, an office chair, a comfort chair or any seat assembly that can benefit by an adjustable posture system.

In a correct neutral seated posture, the load of the upper body is directed through the ischia and into the seat cushion. To ensure the occupant is correctly seated, it has been found that it is helpful to support the occupant's sacrum and direct the position of the sacroiliac joint to allow the occupant to achieve a correct neutral seating posture. By supporting the sacrum lumbar lordosis and hyper-flexion between the sacrum and the L5 vertebrae can be limited or even prevented entirely.

The seat assembly 10 also includes a sacral support system, which is referenced generally by numeral 30. The seat assembly 10 is illustrated with bladders that can be each adjustable and individually or collectively inflated to provide sacral support in the seat.

Figures 3, 4:
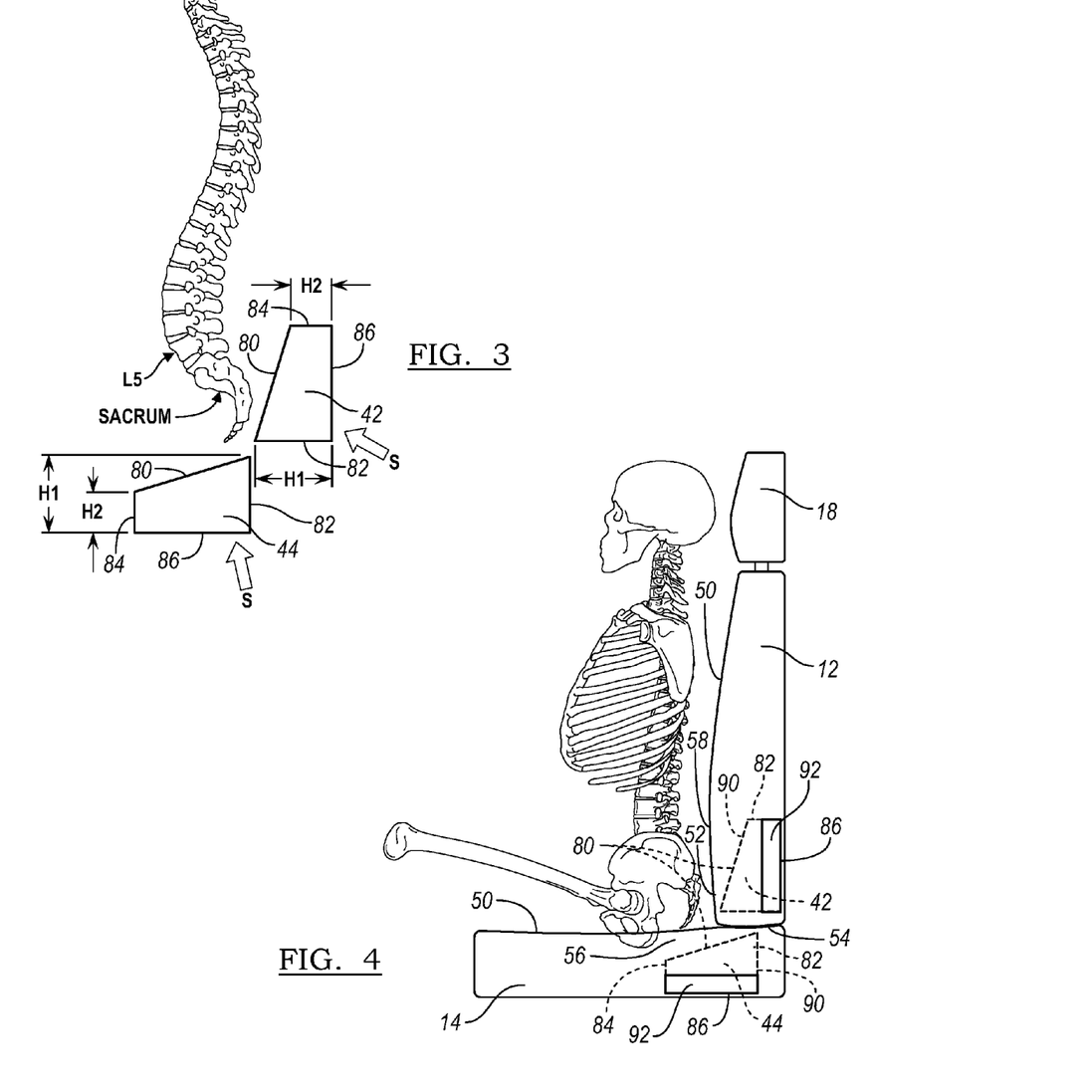
FIG. 3 is a side schematic view of a portion of the sacral support system of FIG. 1 according to one embodiment.
FIG. 4 is a side schematic view of the sacral support system of FIG. 1 according to one embodiment.

According to one embodiment, the sacral support system is a power pneumatic system in a seat back 12 or seat bottom 14 which provides support to sacrum (FIGS. 3-4) and directs the position of the sacroiliac joint to achieve a proper neutral seating posture. The sacral support system 30 may be shaped in a wedge configuration as depicted in FIG. 3, to provide support in a forward and upwards direction (arrow S) to the sacrum while the occupant is seated in a standard seating or driving position.

The sacral support system 30 is provided with actuators 32 disposed in the seat back 12 and seat bottom 14 that move between an extended position and a retracted position. Each actuator 32 may apply pressure or support to the seated passenger.

The actuators 32 may include pneumatic bladders that inflate and deflate to provide various degrees of support to the seated passenger along the seat back 12 or seat bottom 14. The actuators 32 may also include movable supports. For example, the actuators 32 may have any contoured shape support surface. The actuators 32 are formed of a material that has a hardness that is greater than the hardness of the cushion, such as hard plastic or harder foam, in order to provide greater support in the extended position. Further, the actuators 32 extend and retract using any suitable mechanism known to a person having ordinary skill in the art.

As shown in FIG. 1, the sacral support system 30 includes an upper sacral bladder 42 positioned along the lower region 52 of the seat back 12. The lower region 52 of the seat back 12 is adjacent the bite line 54 of the seat where the seat back 12 abuts the seat bottom 14.

Also shown in FIG. 1, the sacral support system 30 includes a lower sacral bladder 44 positioned along a rear region 56 of the seat bottom 14. The rear region 56 of the seat back 12 is adjacent the bite line 54 of the seat where the seat back 12 abuts the seat bottom 14.

The sacral support system 30 may also include a controller 38 for regulating any movement of the actuators 32. For example, as shown in FIG. 4, the controller 38 may regulate compressed air to inflate the bladders 42, 44 to the extended position and similarly deflate the bladders 42, 44 to the retracted position. In one embodiment, the upper sacral bladder 42 is decoupled from the lower sacral bladder 44. By decoupling the actuators, the upper sacral bladder 42 is independently controllable from the lower sacral bladder 44.

The sacral support system 30 may also include a compressor 36 that provides a source of air to the bladder 42, 44. The compressor 36 and controller 38 may be provided in the seat back 12, the seat bottom 14 or concealed within the vehicle body. The controller 38 may be a multifunction controller that also controls other functions in the vehicle. Each of the bladders 42, 44 may include a valve 40 to receive the compressed air. The valves 40 controlled by the controller 38 for regulating compressed air into and out of the bladders 42, 44. The valves 40 for each of the bladders 42, 44 may be controlled independently.

Figure 2A:
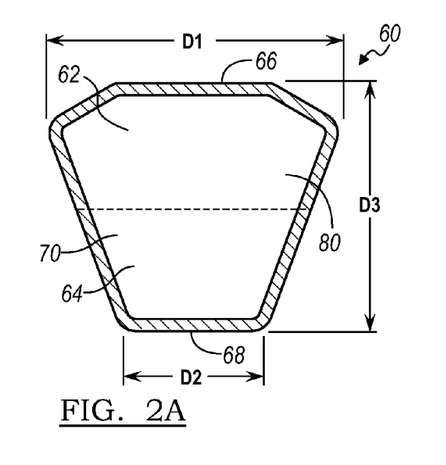
FIG. 2A is an air bladder for use with the seat assembly of FIG. 1 according to one embodiment.
Figure 2B:
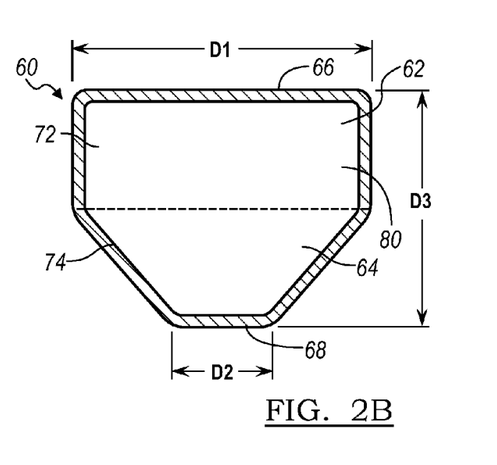
FIG. 2B is an air bladder for use with the seat assembly of FIG. 1 according to one embodiment.

In at least one embodiment, each of the air bladders 42, 44 is shaped as an irregular hexagon bladder 60, as shown in FIGS. 2A and 2B.

In one embodiment, shown in FIG. 2A, the bladder 60 has an irregular, hexagon shape. The hexagon shaped bladder 60 includes an enlarged width portion 62 and an elongated tapered portion 64. The hexagon bladder 60 has a first distal edge 66 forming the distal edge of the enlarged width portion 62. A second distal edge 68 is opposite to the first distal edge 66 and forms the distal edge of the elongated tapered portion 64. As also shown in FIG. 2A, the first distal edge 66 is oriented closer to the overall enlarged width D1. In FIG. 2A, the elongated tapered portion 64 forms a trapezoidal shape 70 that continuously tapers from the overall enlarged width D1. In the embodiment shown in FIG. 2A, the first distal edge 66 is generally parallel to the second distal edge 68 and the first distal edge 66 has generally the same narrow width dimension D2 as the second distal edge.

In another embodiment, shown in FIG. 2B, the bladder 60 includes a rectangular portion 72 and a trapezoidal portion 74 that cooperate to form the irregular, convex hexagon shape. In FIG. 2B, the enlarged width portion 62 is defined by the rectangular portion 72. The trapezoidal portion 74 defines the elongated tapered portion 64. In the embodiment in FIG. 2B, the hexagon bladder 60 has a first distal edge 66 that is longer than and opposite to a second distal edge 68. The long distal edge 66 defines the enlarged width D1 of the rectangular portion 62 and of the hexagonal bladder 60. The trapezoidal portion 74 narrows from the rectangular portion 72 to the short distal edge 68. In the embodiment shown in FIG. 2B, the long distal edge 66 is generally parallel to the short distal edge 68.

While two embodiments describing irregular hexagon shaped bladders 60 are illustrated in FIGS. 2A and 2B, other shaped bladders are possible that include an enlarged width portion 62 and an elongated tapered portion 64. For example, the bladders may have a wedge or triangle shape or other suitable shape that has an enlarged width portion 62 cooperating with an elongated tapered portion 64.

The elongated tapered portion 64 may be sized to be located between the ischia of an average occupant. For example, the second distal edge 68 may have a dimension D2 being approximately 30 millimeters (mm). Alternatively, the second distal edge 68 may have a dimension D1 in the range of 30 mm to 70 mm, for example. The expanded width D1 may have a dimension being approximately 116 mm. Alternatively, the expanded width D1 may have a dimension in the range of 60 mm to 120 mm, for example.

The bladder 60 may have an overall length D3 of approximately 120 mm. Alternatively, the overall length D3 may have a dimension in the range of 80 mm to 150 mm, for example. As shown in FIG. 2A and FIG. 2B, the elongated tapered portion 64 is at least half of the overall length D3. Of course, the dimensions may vary based on the seat design, seat dimensions and the intended occupant, as well as other considerations.

When inflated, the bladder 60 has an inclined support surface 80 relative to a seating surface of the seat 10. The inclined support surface 80 is defined because the second distal edge 68 inflates and extends to a height that is greater than the first distal edge 66, as shown in FIG. 3. For example, the second distal edge 68 inflates and extends to a first height 82 that is greater than a second height 84 of the first distal edge 66. The first height 82 may have a dimension H1 in the range of 30 mm to 60 mm, while the second height 84 may have a dimension H2 between zero and 45 mm.

While the irregular hexagon shaped bladder 60 is illustrated, other shaped bladders having a generally planar surface that includes an elongated tapered portion 64 extending from an enlarged width portion are possible. For example, the bladders may have a wedge or triangle shape or other suitable shape that has an enlarged width portion 62 cooperating with an elongated tapered portion 64.

The second distal edge 68 includes folds (not shown) disposed between the support surface 80 and a mounting surface 86. When the bladders 42, 44 are inflated to an expanded position 90, the folds along the second distal 68 expand in an accordion-like manner to the first height 82. The first distal edge 66 may include fewer folds, or no folds at all, so that the second height 84 is less than the first height 82. Along the first distal edge 66, the support surface 80 may be directly connected to the mounting surface 86 so that the first distal edge 66 does not expand at all when inflated. In the retracted position 92, the bladders 42, 44 are not inflated and are generally flat, as shown in FIG. 4.

The upper bladder 42 and lower bladder 44 may each have different dimensions, even though the overall shape may be similar, as shown in FIG. 1. Alternatively, the upper bladder 42 and lower bladder 44 may each have a different shape while each having an enlarged width portion 62 cooperating with an elongated tapered portion 64.

As shown in FIG. 1, the vehicle seat assembly 10 includes a seat frame 48. The seat frame 48 may have a plurality of mounting brackets adapted to operatively secure the seat frame 48 within a passenger compartment of a vehicle. Any suitable seat frame may be used. The seat frame 48 may be constructed from any material suitable for application within a vehicle seat assembly 10, such as aluminum, steel or other metal alloy, composite material, or a suitable polymer. Further, the seat frame 48 may be manufactured using techniques commonly known in the art, and relative to the type of material employed. For example, manufacturing techniques may include stamping, welding, fastening or molding a suitable material to form the seat frame 48. The bladders 42, 44 may be disposed between the frame 48 and the seat cushion. Alternatively, the bladders 42, 44 may be positioned on an A-surface of the cushion between the cushion and a trim cover 20.

The bladders 42, 44 may be attached to the frame 48 or the seat cushion along the mounting surface 86 of the bladders. The mounting surface 86 remains stationary in a mounting position to ensure the bladders are maintained in a correct position for providing proper support for the occupant's sacrum.

Additionally, an array of pressure sensors may be provided in the seat back 12 and seat bottom 14, such as along the lower pelvic region 52 and a lumbar region 58, above the lower pelvic region 52, of the seat back 12. Sensors may also be provided in each of the bladders 42, 44. The sensors measure pressure or proximity at each location to provide feedback to the controller 38 for subsequent adjustment and monitoring as described in the prior embodiments. The sensors may be bladder pressure sensors, bladder valve pressure feedback sensors, proximity sensors, tri-axial angular measurement sensors or the like. Additionally, any arrangement and quantity of sensors is contemplated for various seat assembly embodiments.

The sensors measure pressure readings that are conveyed to the controller 38. The controller 38 compares pressure values to determine if the occupant is seated with hyper-flexion between the sacrum and the L5 vertebrae, for example. If the controller 38 determines that the pressure is constant along lower sacral/pelvic region and the lumbar region, the controller 38 can determine that the occupant does not have hyper-flexion between the sacrum and the L5 vertebrae. If the pressure readings along the lumbar region 58 are less than along the lower pelvic region 52, the controller 38 can determine that the occupant is has hyper-flexion between the sacrum and the L5 vertebrae. In response to determining the occupant has hyper-flexion, the controller may commands the sacral air bladders 42, 44 to be inflated. A control system for positioning the pelvis of the occupant in a neutral position was disclosed by the Applicant in U.S. application Ser. No. 14/869,093, and is hereby incorporated by reference.

As shown in FIGS. 3-4, when the bladders 42, 44 are inflated the support surface 80 provides support in a forward and upwards direction, as shown by arrow S. The bladders 42, 44 provide support to the sacrum while the occupant is seated in a standard seating or driving position. By providing the forward and upward support, the bladders 42, 44 rotate the occupant's pelvis under and ensure the occupant is in a neutral seated position and reduce or eliminate hyper-flexion between the sacrum and the L5 vertebrae.

As shown in FIG. 4, the upper bladder 42 is positioned along the lower region of the seat back 12. The second distal edge 68 of the upper bladder 42 is aligned with a lower edge of the seat back frame 48. The upper bladder 42 is sized so that the length D3 of the bladder 42 generally does not extend above the pelvis of an average-sized occupant.

As also shown in FIG. 4, the lower bladder 44 is positioned along the rear region 56 of the seat bottom 14. The second distal edge 68 of the lower bladder 42 is aligned with a rear edge of the seat bottom frame 48. The lower bladder 44 is sized so that the length D3 of the lower bladder 44 is generally positioned under the pelvis and buttocks of the occupant not extending under the thighs of an average-sized occupant.

Figure 5:
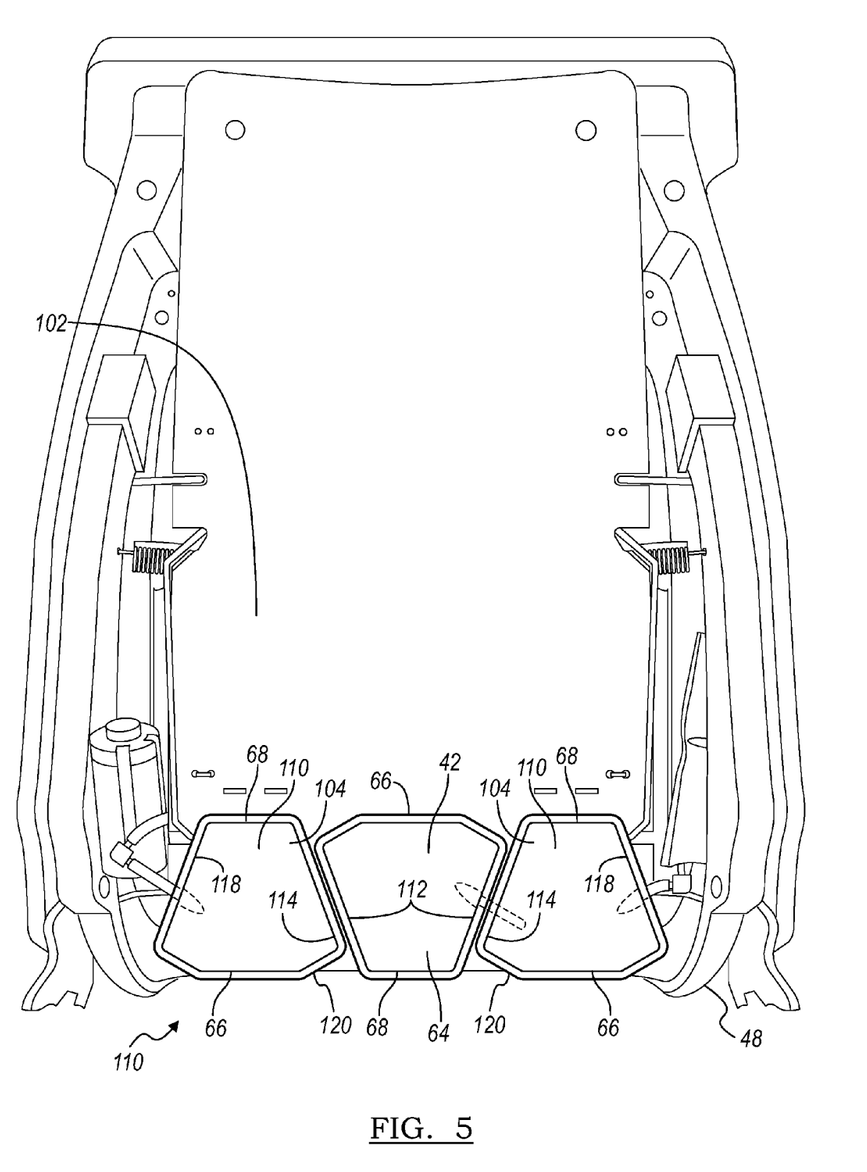
FIG. 5 is a view of a portion of a seat assembly incorporating a pelvic support system.

FIG. 5 illustrates a portion of a seat assembly 10 showing the seat back 12 with the trim and cushion removed so that the seat back frame 48 is visible. As shown in FIG. 5, an air bladder assembly 100 may be mounted to a suspension 102, such as a wire mat, that is connected to the frame 48 of the seat back 12 illustrated in FIG. 1.

FIG. 5 further illustrates an air bladder assembly 100 for supporting the pelvic region of an occupant. The bladder assembly 100 includes the central sacral air bladder 42 as well as a pair of side air bladders 110. As discussed above with reference to FIGS. 1-4, the central sacral air bladder provides support to the occupants' sacrum. The side air bladders 110 are designed to support the iliac and ischium structures of the occupant's pelvis. Supporting the occupant's iliac and ischium helps position the occupant's spine into a neutral position when seated in the seat assembly 10. When the hips are flexed, the pelvis is tiled posteriorly, or rearward, with respect to the sacrum causing a nutation and movement in the sacroiliac joint. The iliac bladders 110 and sacral bladder 42 may be adjusted to control nutation of the sacrum and sacroiliac joint and thereby help position the occupant's spine in a neutral position. By positioning the pelvis and sacrum correctly at the base of the spine, it may be easier to also position the lumbar and thoracic regions of the occupant's spine in a neutral position.

Like the central sacral bladder 42, the iliac side bladders 110 may have a support surface defined by an irregular hexagonal shaped bladder 60 having an enlarged width portion 62 connected to an elongated tapered portion 64. Examples of the hexagonal shaped bladder 60 are illustrated in FIGS. 2A-2B.

As shown in FIG. 5, the pair of iliac bladders 110 are positioned so that the tapered portions 104 are oriented opposite the elongated tapered portion 64 of the sacral bladder 42. Each of the elongated tapered edges 112 of the sacral central bladder 42 are positioned adjacent to one of the elongated tapered edges 114 of each of the iliac side bladders 110. The tapered edges 114 of the iliac side bladders 110 are positioned parallel to the tapered edges 112 of the central bladder 42.

As illustrated in FIG. 5, the iliac side bladders 110 are symmetric laterally. However, the iliac side bladders 110 may have any shape that coordinates with the sacral central bladder 42. For example, while the side bladders 110 have inner tapered edges 114 to coordinate with the tapered edges 112 of the central bladder 42, the outer edges 118 may be parallel to an edge of the suspension 102.

The first distal end 66 of the pair of side iliac bladders 110 is aligned with the second distal end 68 of the central bladder 42, all of which are aligned to a bottom edge 120 of the frame 48. Similarly, the second distal end 68 of the pair of side iliac bladders 110 is aligned with the first distal end 66 of the central bladder 42.

The side iliac bladders 110 inflate to a uniform thickness. Unlike the central bladder 42 that inflates so that the support surface is inclined relative to the seating surface 50, the side iliac bladders 110 inflate to be generally parallel to the seating surface 50 of the seatback 12. As such, when inflated, the support surface of the central sacral bladder 42 is not parallel to the support surface of the side iliac bladders 110.

Again, an array of pressure sensors is provided in the seat back 12 and seat bottom 14 to measure pressure readings that are conveyed to the controller 38. The controller 38 compares pressure values to determine if the occupant is seated with nutation in the sacroiliac joint. Sensors may also be provided in each of the iliac bladders 110 and sacral bladder 42.

The sacral bladder 42 and iliac bladders 110 can be adjusted to a proscribed position to position the sacrum and pelvis to support a neutral spinal position of the occupant. The iliac bladders 110 and sacral bladder 42 may be inflated in a predetermined sequence and to predetermined pressures depending on the occupant anthropometric range or based on the occupant's seat position and/or contour. For example, the controller 38 compares the sensor values, and if the controller 38 determines that the occupant is not seated evenly, the controller 38 balances the air pressure in opposing iliac air bladders 110 to balance the occupant seating position.

Figure 6:
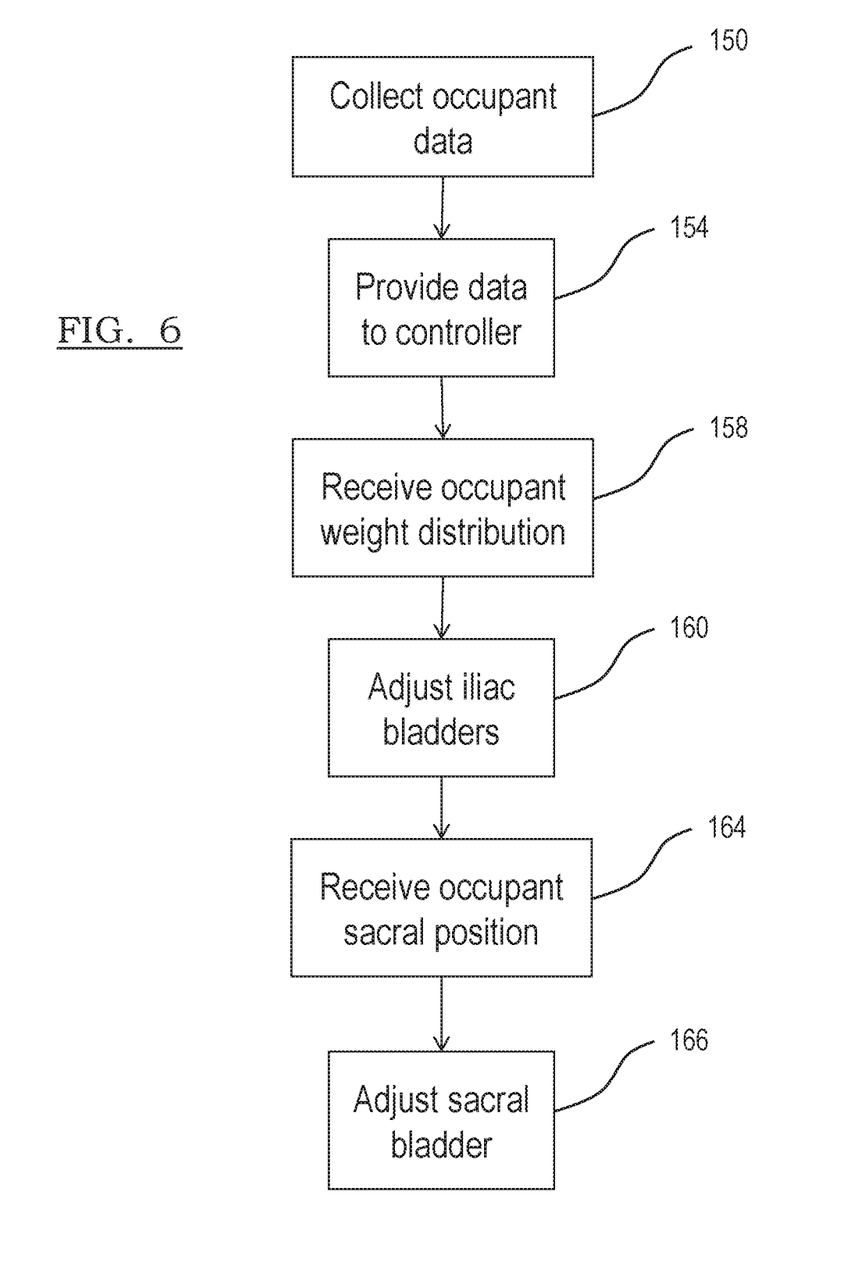
FIG. 6 illustrates a flowchart for a method of adjusting the seat assembly of FIG. 5.

FIG. 6 depicts a flowchart for a method of adjusting the seat assembly 10 according to one embodiment. At block 150 the controller initiates a data collection process that allows that occupant to provide input such as the occupant's name. Anthropometric and ergonomic data and activity level may be collected. The data may be collected via an application on a PDA, tablet or smartphone, or in a controller in the vehicle. The data collected is provided to the controller 38, as shown in block 154.

At block 158, the controller 38 receives an occupant weight distribution from the pressure sensors, such as pressure sensors disposed in the air bladders.

At block 160, the controller adjusts the pressures of the iliac bladders 110. Live values are adjusted, such as a percentage of bladder fullness or bladder pressure. The iliac bladders 110 are adjusted so distribute the occupant's weight evenly in the lateral direction. Steps 158 and 160 may be repeated incrementally. The pair of iliac air bladders 110 may be adjusted in steps 158 and 160 by inflating the pair of iliac bladder 110 incrementally until a pressure in each of the iliac air bladders 110 is generally equal.

At block 164, the controller 38 also receives an occupant sacral position from the pressure sensors. At block 166, the controller adjusts the pressures of the central sacral bladder 42. The sacral bladder 42 is adjusted to position the sacrum in a neutral position in a fore-aft direction being generally perpendicular to the lateral direction. The central air bladder 42 is adjusted by inclining the central support surface 80 relative to a seating surface 50 of the seat back 12. Live values are adjusted, such as a percentage of bladder fullness or bladder pressure or other sensor readings. The lower sacral bladder 44 located in the seat bottom 14 may also be adjusted to position the occupant in the fore-aft direction, as shown and discussed in relation to FIGS. 3-4. Sacral bladders 42, 44 can be adjusted for sacral nutation/counter nutation.

A control system for sequentially inflating air bladders to position the occupant's spine in a neutral position was disclosed by the Applicant in U.S. application Ser. No. 14/575,474, and is hereby incorporated by reference.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
    a seat bottom;
    a seat back mounted adjacent the seat bottom and extending generally in an upright direction; and
    three air bladders arranged in a lateral array and positioned in the pelvic region of the seat back, the three air bladders each having a support surface defined by an enlarged width portion at a first distal end extending to a tapered portion at a second distal end, such that the tapered portion that is more narrow than the enlarged width portion, wherein a central bladder is oriented so that the tapered portion of the central bladder is opposite the taper portion of two side bladders in the upright direction.

2. The seat assembly of claim 1 wherein a seating surface of the seat back and the seat bottom are joined at a bite line; and wherein the three bladders are positioned adjacent the bite line.

3. The seat assembly of claim 2 wherein the central bladder is oriented with the tapered portion positioned closer to the bite line, and the side bladders are oriented with the enlarged width portion closer to the bite line.

4. The seat assembly of claim 1 wherein the tapered portion is defined by elongated sides whereby each of the elongated sides of the central bladder is positioned adjacent to one of the elongated sides of each of the side bladders.

5. The seat assembly of claim 1 wherein inflation of the central bladder inclines the central support surface from the tapered portion to the enlarged width portion relative to a seating surface of the seat back.

6. The seat assembly of claim 5 wherein the side bladders inflate so that a side support surface is generally parallel to the seating surface of the seat back.

7. The seat assembly of claim 1 wherein when the three air bladders are inflated, the support surface of the central bladder is not parallel to the support surface of the side bladders.

8. The seat assembly of claim 1 wherein the support surface of each of the three air bladders is a generally hexagonal shape.

9. The seat assembly of claim 1 wherein a lateral array of the three air bladders is symmetric about an upright axis of the seat back.

10. The seat assembly of claim 1 wherein the seat back includes a frame and one of the first and second distal ends of each of the three air bladders is aligned with a lower edge of a seat back frame.

11. An air bladder assembly for a seat comprising:
a central bladder having a central support surface defined by an enlarged width portion connected to an elongated tapered portion, wherein the tapered portion is defined by elongated lateral sides; and
a pair of side iliac bladders wherein one of the side bladders is positioned adjacent each of the elongated sides of the central bladder,
wherein inflation of the central bladder inclines the central support surface from the tapered portion to the enlarged width portion relative to a seating surface of a seat back,
wherein the pair of side bladders inflate so that a side support surface of each of the side bladders is generally parallel to the seating surface of the seat back such that the central support surface of the central bladder is not parallel to a side support surface of the each of the pair of side bladders when the air bladder assembly is inflated.

12. The air bladder assembly of claim 11 wherein the central support surface is a generally hexagonal shape.

13. The air bladder assembly of claim 11 wherein the side bladders are positioned on opposite lateral sides of the central bladder; and
wherein the central bladder and side bladders have a length in an upright direction being generally equal whereby distal ends of the central bladder and side bladders are aligned.

14. The air bladder assembly of claim 11 wherein a lower distal end of the side bladders and the central bladder are aligned.

15. An air bladder assembly for a seat comprising:
a central bladder having a central support surface defined by an enlarged width portion connected to an elongated tapered portion, wherein the tapered portion is defined by elongated lateral sides; and
a pair of side iliac bladders wherein one of the side bladders is positioned adjacent each of the elongated sides of the central bladder,
wherein inflation of the central bladder inclines the central support surface from the tapered portion to the enlarged width portion relative to a seating surface of a seat back,
wherein the side bladders are positioned on opposite lateral sides of the central bladder; and
wherein the central bladder and side bladders have a length in an upright direction being generally equal whereby distal ends of the central bladder and side bladders are aligned.

16. The air bladder assembly of claim 15 wherein a lower distal end of the side bladders and the central bladder are aligned.

17. The air bladder assembly of claim 15 wherein the central support surface is a generally hexagonal shape.

* * * * *